March 28, 1933. T. FUJII 1,903,038

FELT RUBBER ROLLER

Filed Sept. 29, 1930

T. Fujii INVENTOR

By Marks & Clerk Attys.

Patented Mar. 28, 1933

1,903,038

UNITED STATES PATENT OFFICE

TOKUTARO FUJII, OF AZABU KU, TOKYO, JAPAN, ASSIGNOR TO EIJIRO YAMAMOTO, OF TOKYO, JAPAN

FELT RUBBER ROLLER

Application filed September 29, 1930, Serial No. 485,333, and in Japan December 10, 1929.

The present invention relates to an inking roller for use in printing which is made by winding felt around the roller stock, winding sponge rubber around it and then wrapping the same in the tubular felt impregnated with the mixed solution of virgin rubber, filler, sulphur and solvent and then vulcanized, namely felt rubber. The object thereof is to obtain a roller which keeps the elasticity of the rubber roller, but does not slip like it, has the surface as good as that of the leather roller, but homogeneous, and thus maintains such elasticity and surface as allow ink to adhere perfectly.

Referring to the accompanying drawing.

In the drawing, the same reference numbers show the same parts.

Figure 1:
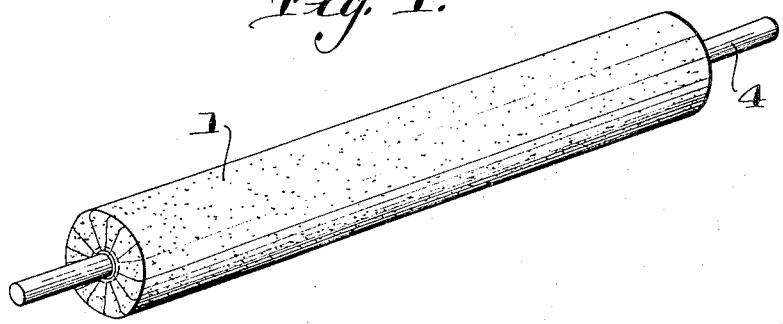
Fig. 1 is a perspective view of the roller according to this invention.
Figure 2:
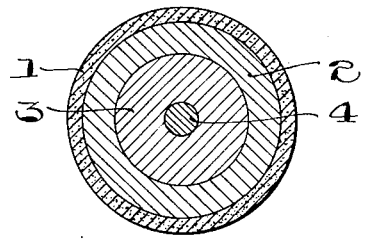
Fig. 2 is a sectional view of the same.

According to this invention, felt 3 is wound around the stock 4 of the roller and then sponge rubber 2 of the proper thickness is wound around it. On the other hand,

| | Grams |
|---|---|
| Virgin rubber | 100 |
| Barium sulphate | 40 |
| Sulphur | 15 |
| Vegetable oil (soja bean oil or castor oil) | 10 |
| are kneaded together and dissolved with | |
| Benzol | 60 |
| Naphtha | 40 |

Then, the felt previously formed in a tubular shape is well impregnated with the above solution and is heated and vulcanized (called "felt rubber 1" in this invention). Then, it covers the roller stock and has its both ends tied around the stock 4. Finally, its surface is made smooth. The thickness and elasticity of the sponge rubber 2 are more or less regulated according to the object of printing. Thus, according to this invention the roller does not only retain the suitable elasticity of the rubber roller by using the felt 3 and sponge rubber 2, but since the felt rubber 1 itself is elastic and has the fibre of felt, there is no fear of the ink adhering to the roller imperfectly owing to the slipping of the roller by the ink during printing operation, as is the case with the rubber roller. Also, the felt rubber 1 has the hardness and the quality of the surface like leather, but is homogeneous unlike the leather roller (in a big roller, even one animal skin has different thickness and quality according to its parts so it is very difficult to obtain a homogeneous roller). Therefore, it allows ink to adhere well. Further, as it has the tubular surface impregnated with the mixed solution and then dried, there is no fear of its being broken at the seam as in the leather. Such being the case, the roller according to this invention has the merit, but not the fault of the rubber roller.

I claim:

1. An inking roller comprising a stock, a layer of felt wound around the stock, a layer of spongy rubber on the felt layer, and a tubular felt covering impregnated with vulcanized rubber compound.

2. An inking roller comprising a stock, a layer of felt wound around the stock, a layer of spongy rubber on the felt layer, and a tubular felt covering impregnated with vulcanized rubber compound consisting of rubber and felt.

TOKUTARO FUJII.